United States Patent
Brahmankar et al.

(10) Patent No.: US 12,524,713 B2
(45) Date of Patent: Jan. 13, 2026

(54) FORECASTING RECURRING ANOMALIES IN TIME SERIES DATA

(71) Applicant: Ciena Corporation, Hanover, MD (US)

(72) Inventors: Saurabh Dinesh Brahmankar, Nagpur (IN); Christopher Ryan Barber, Ottawa (CA); Minming Ni, Kanata (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 18/636,756

(22) Filed: Apr. 16, 2024

(65) Prior Publication Data

US 2025/0278678 A1  Sep. 4, 2025

(30) Foreign Application Priority Data

Mar. 1, 2024 (IN) .............................. 202411015405

(51) Int. Cl.
  *G06Q 10/04*  (2023.01)
  *G06F 16/2458*  (2019.01)

(52) U.S. Cl.
  CPC ......... *G06Q 10/04* (2013.01); *G06F 16/2477* (2019.01)

(58) Field of Classification Search
  CPC .............................. G06Q 10/04; G06F 16/2477
  See application file for complete search history.

(56) References Cited

U.S. PATENT DOCUMENTS

| | | | |
|---|---|---|---|
| 10,015,057 B2 | 7/2018 | Djukic et al. | |
| 10,129,168 B2 * | 11/2018 | Kaminski | H04L 47/83 |
| 11,356,320 B2 | 6/2022 | Côté et al. | |
| 11,620,528 B2 | 4/2023 | Ryan et al. | |
| 11,704,539 B2 | 7/2023 | Amiri et al. | |
| 11,706,100 B2 * | 7/2023 | Poteat | H04L 47/83 |
| | | | 709/224 |
| 11,726,982 B1 * | 8/2023 | Azam | G06N 3/09 |
| | | | 707/690 |
| 2012/0278051 A1 * | 11/2012 | Jiang | G06Q 10/04 |
| | | | 703/2 |
| 2015/0029847 A1 * | 1/2015 | Puleri | H04L 47/25 |
| | | | 370/233 |
| 2016/0062950 A1 * | 3/2016 | Brodersen | G06F 18/2433 |
| | | | 702/181 |
| 2019/0222491 A1 | 7/2019 | Tomkins et al. | |
| 2019/0280942 A1 | 9/2019 | Côté et al. | |
| 2019/0303726 A1 | 10/2019 | Côté et al. | |
| 2020/0065213 A1 * | 2/2020 | Poghosyan | G06N 3/044 |
| 2020/0387797 A1 | 12/2020 | Ryan et al. | |
| 2021/0150305 A1 | 5/2021 | Amiri et al. | |
| 2022/0335347 A1 * | 10/2022 | Doan Huu | G06N 20/00 |
| 2023/0011452 A1 | 1/2023 | Barber et al. | |
| 2023/0022401 A1 | 1/2023 | Amiri et al. | |

(Continued)

*Primary Examiner* — William P Bartlett
(74) *Attorney, Agent, or Firm* — Baratta Law PLLC; Lawrence A. Baratta, Jr.

(57) ABSTRACT

Systems and methods for forecasting recurring anomalies in time series data include determining forecast data from historical data of time series data where the forecast data is for a desired future time span; combining the forecast data with the historical data to form a combined time series; determining a normal operating range using the combined time series; detecting anomalies in the forecast data based on the normal operating range; and providing an output including the detected anomalies in the forecast data.

20 Claims, 10 Drawing Sheets

(56) References Cited

U.S. PATENT DOCUMENTS

| | | |
|---|---|---|
| 2023/0047781 A1* | 2/2023 | Narayanan ............ G06F 16/285 |
| 2023/0057444 A1 | 2/2023 | Djukic et al. |
| 2023/0216747 A1 | 7/2023 | Barber et al. |
| 2023/0409875 A1 | 12/2023 | Djukic et al. |
| 2024/0242159 A1* | 7/2024 | Parthasarathy .. G06Q 10/06393 |

* cited by examiner

FIG. 5

FORECASTING RECURRING ANOMALIES IN TIME SERIES DATA

FIELD OF THE DISCLOSURE

The present disclosure relates generally to artificial intelligence. More particularly, the present disclosure relates to systems and methods for forecasting recurring anomalies in time series data.

BACKGROUND OF THE DISCLOSURE

Time series data (also referred to herein as a time series) includes a series of data points indexed (or listed or graphed) in time order. For example, a time series can be a sequence taken, monitored, polled, etc. at successive equally spaced points in time. Examples of time series are heights of ocean tides, counts of sunspots, temperature (weather), stock prices, network traffic, and the like. In all of these applications, there is a value in forecasting future values based on historical values of a given time series, e.g., to perform some function in anticipation of the future values. Time series forecasting involves an integration of trend forecasting, seasonality analysis, and confidence intervals to produce an accurate forecast. In a given time series, an anomaly is a valid value, but one whose value differs significantly from the rest of the time series. That is, anomalies in time series are values that are highly inconsistent with those expected around at those time points. For example, anomalies can be mathematically defined, such as being a certain number of standard deviations from the rest of the time series. Conventional techniques face various challenges related to forecasting and detecting recurring anomalies in time series, associated with dynamic environments.

BRIEF SUMMARY OF THE DISCLOSURE

The present disclosure relates to systems and methods for forecasting recurring anomalies in time series data. The present disclosure includes an architecture that integrates pre-existing trend forecasting techniques with automated recurring anomaly prediction, creating an all-encompassing solution under a unified framework. The architecture introduces a pioneering concept of sensitivity boundaries, defined by an interval width, for predicting anomalies. Through a comparison between forecasted data points and these boundaries, the architecture can detect anomalies that exhibit substantial deviations from the expected behavior. With a forecast of an anomaly, the architecture promptly generates alerts to inform pertinent stakeholders, enabling a proactive response and timely intervention for swift attention to potential issues, streamlining efficient troubleshooting and remediation.

In various embodiments, the present disclosure contemplates implementation as a method having steps, via a processing device configured to implement the steps, and a non-transitory computer-readable medium storing instructions that, when executed, cause one or more processors to implement the steps. The steps include determining forecast data from historical data of time series data where the forecast data is for a desired future time span; combining the forecast data with the historical data to form a combined time series; determining a normal operating range using the combined time series; detecting anomalies in the forecast data based on the normal operating range; and providing an output including the detected anomalies in the forecast data. The steps can further include providing the output as an alert in a graphical user interface. The graphical user interface can include a dashboard that displays one or more of the detected anomalies in the forecast data and their corresponding times, associated equipment related to the detected anomalies, aggregate data for a plurality of time series and any detected anomalies, a number of forecasts, and a percentage of forecasts that came true.

The steps can further include triggering a workflow based on the output. The time series data can relate to a network and describes network traffic therein, and wherein the workflow includes scaling up or down network resources in the network based on the detected anomalies and their corresponding times. The normal operating range can be a predefined interval width on the combined time series and the detecting anomalies includes determining any forecast data outside a sensitivity boundary of the predefined interval width. The time series data can be associated with Performance Monitoring (PM) data in a network. The steps can further include performing the determining the forecast data, the combining, the determining the normal operating range, the detecting, and the providing for one or more additional time series that are each different PM data in the network.

BRIEF DESCRIPTION OF THE DRAWINGS

The present disclosure is illustrated and described herein with reference to the various drawings, in which like reference numbers are used to denote like system components/method steps, as appropriate, and in which:

FIG. 5 is a screenshot of an AAA anomaly forecast alert Graphical User Interface (GUI).

DETAILED DESCRIPTION OF THE DISCLOSURE

Figure 1:
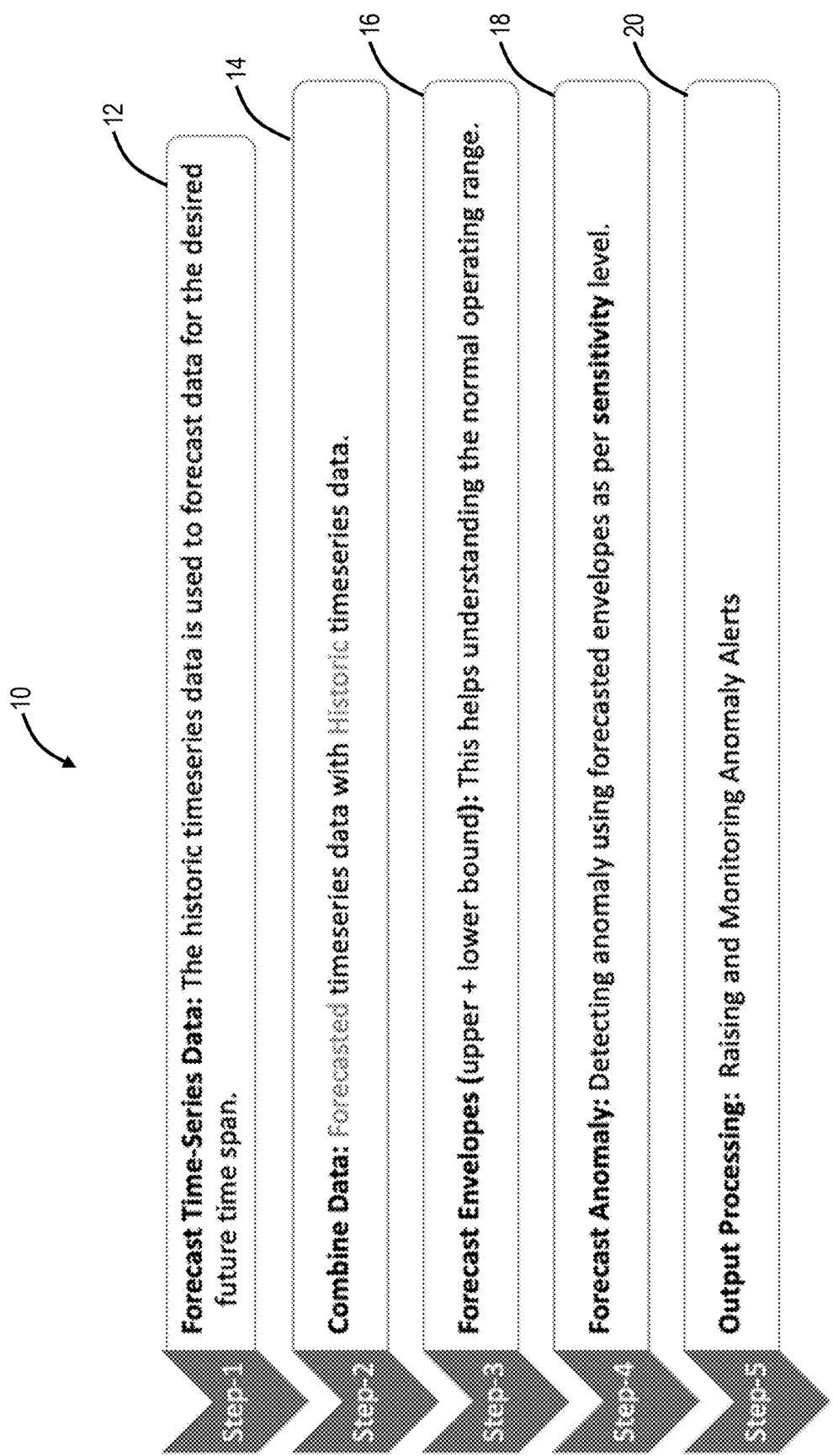
FIG. 1 is a flowchart of a process for forecasting recurring anomalies in time series data.

Again, the present disclosure relates to systems and methods for forecasting recurring anomalies in time series data associated with a dynamic environment. As described herein, the environment is where the time series comes from, and the term dynamic simply refers to the fact the values vary in the time series. Those skilled in the art will recognize there are numerous examples of time series, again, e.g., heights of ocean tides, counts of sunspots, temperature (weather), stock prices, network traffic, and the like. The present disclosure utilizes network traffic demands for an example use case. Those skilled in the art will appreciate this is merely one example and the various techniques described herein can be applied to any time series having recurring anomalies for accurate forecasting thereof.

Challenges

Prior to the present disclosure, the technological landscape encountered several challenges related to forecasting and detecting recurring anomalies within dynamic environments, including:

(1) Traditional forecasting techniques faced hurdles in accurately predicting outcomes in intricate and rapidly changing settings, such as network traffic analysis.
(2) Anomaly detection primarily relied on manual analysis and visual inspection, proving time-intensive and incapable of accurately forecasting recurring anomalies in future data sets.
(3) Existing solutions in time-series data forecasting predominantly leaned on statistical models like Autoregressive integrated moving average (ARIMA) and exponential smoothing, facing limitations in capturing intricate patterns and accommodating recurring seasonality trends, especially concerning forecasting recurring anomalies.
(4) Anomaly forecast was often addressed using statistical techniques like z-score and threshold-based methods. Unfortunately, these approaches fell short in accurately predicting future recurring anomalies.
(5) Previous attempts to fuse forecasting with anomaly detection typically utilized disjointed models or algorithms, leading to suboptimal integration and limited accuracy in forecasting future recurring anomalies.

Disadvantageously, these limitations significantly hampered efficient resource management, proactive decision-making, and timely troubleshooting in complex, dynamic environments, emphasizing the need for a more integrated and precise solution, specifically in forecasting recurring anomalies. In networking, in particular, these conventional approaches include the following disadvantages:

(1) Lower Performance: Traditional forecasting methods often fall short in providing accurate predictions for fluctuating traffic patterns, leading to inefficient resource utilization.
(2) Complexity: Manual recurring anomaly detection in complex network environments with vast amounts of data is time-consuming and error prone.
(3) Cost: Some existing solutions for recurring anomaly detection may require expensive hardware or software implementations, adding to the overall cost.
(4) Lack of Scalability: Known solutions may not be easily scalable to accommodate the increasing demands of modern networks.
(5) Limited Insights: Existing methods may fail to capture and account for seasonal trends in forecasted data, leading to suboptimal resource planning and network performance.
(6) Single Framework: The existing solutions lacked a comprehensive methodology that seamlessly integrated accurate forecasting, consideration of seasonality trends, and automated recurring anomaly forecast within a single framework.

In today's rapidly evolving network landscape, the ability to scale network resources just-in-time to meet future traffic demands is crucial. Accurately forecasting future data trends, including traffic patterns and anomalies, is essential for efficient resource allocation and optimal network performance. This invention addresses these challenges by introducing a novel methodology that combines accurate forecasting, consideration of seasonality trends, and automated recurring anomaly forecast.

Background

Time series forecasting involves an integration of trend forecasting, seasonality analysis, and confidence intervals to produce an accurate forecast. This involves breaking down historical time series data into essential components such as trend, seasonality, and special events, which are used to estimate the future trend and providing upper and lower bounds for the forecast. Many open-source forecasting packages include these features out of the box, such as Prophet, available from Facebook and online at facebook.github.io/prophet/. The present disclosure utilizes these forecasting algorithms in a novel way to forecast recurring anomalies in time series data. Note, Prophet is used in one example implementation, and those skilled in the art will recognize any forecasting approach can be used herewith, allowing users flexibility to select the best-fit forecasting approach.

Methodology

FIG. 1 is a flowchart of a process 10 for forecasting recurring anomalies in time series data. The process 10 contemplates implementation as a computer-implemented method having steps, via a processing device or system configured to implement the steps, via a cloud service configured to implement the steps, and as a non-transitory computer-readable medium storing instructions that, when executed, cause one or more processors to implement the steps.

Figure 2:
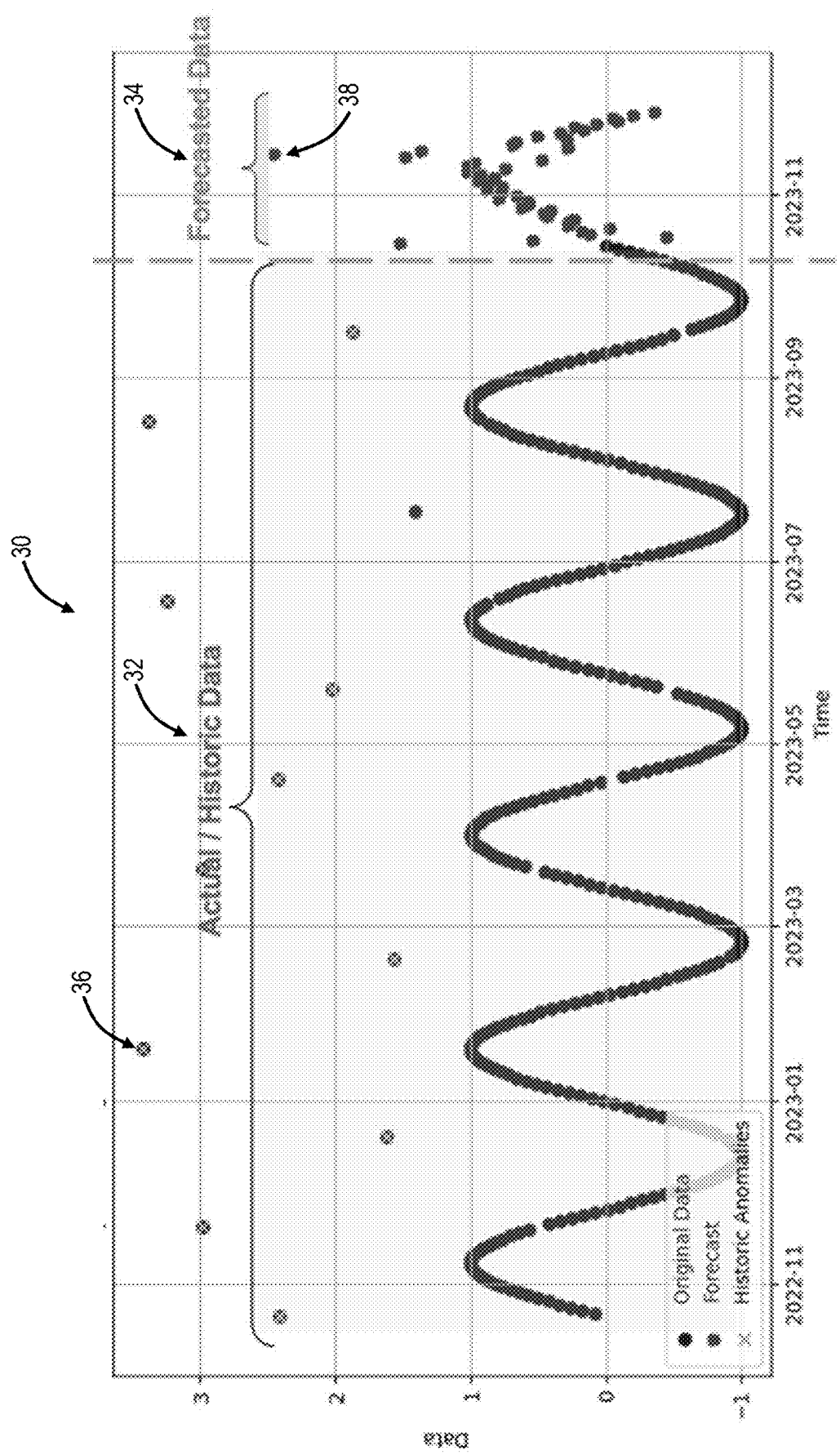
FIG. 2 is a graph of an example time series including historical data, forecasted data, historical anomalies, and forecasted anomalies.

The process 10 includes a forecasting step 12 where historic time series data is used to forecast data for a desired future time span. The forecasting step 12 uses a historical time series dataset as input to forecast the future trend, taking into account the overall trend, seasonality, and (optionally) special events. FIG. 2 is a graph of an example time series 30 including historical data 32, forecasted data 34, historical anomalies 36, and forecasted anomalies 38. The time series 30 was forecasted using Prophet. Note, the general trend shows a sinusoidal curve in both the historical data 32 and the forecasted data 34, as well as the historical anomalies 36 and the forecasted anomalies 38 that vary therefrom. Of note, with traffic demands, this general sinusoidal curve may represent real traffic demands in a network. Of course, other types of time series will show different characteristics and the sinusoidal curve is presented for ease of illustration.

Next, the process 10 includes a data combination step 14 (or data augmentation) where the forecasted time series data is combined with the historical time series data to form a combined time series. In FIG. 2, this would mean the historical data 32, the forecasted data 34, the historical anomalies 36, and the forecasted anomalies 38 are all combined to form the combined time series. Here, the forecasted future data is merged with the original historic data, creating a comprehensive and augmented dataset. This integration enhances the accuracy of subsequent analysis and provides a holistic view of future time series behavior.

Figure 3:
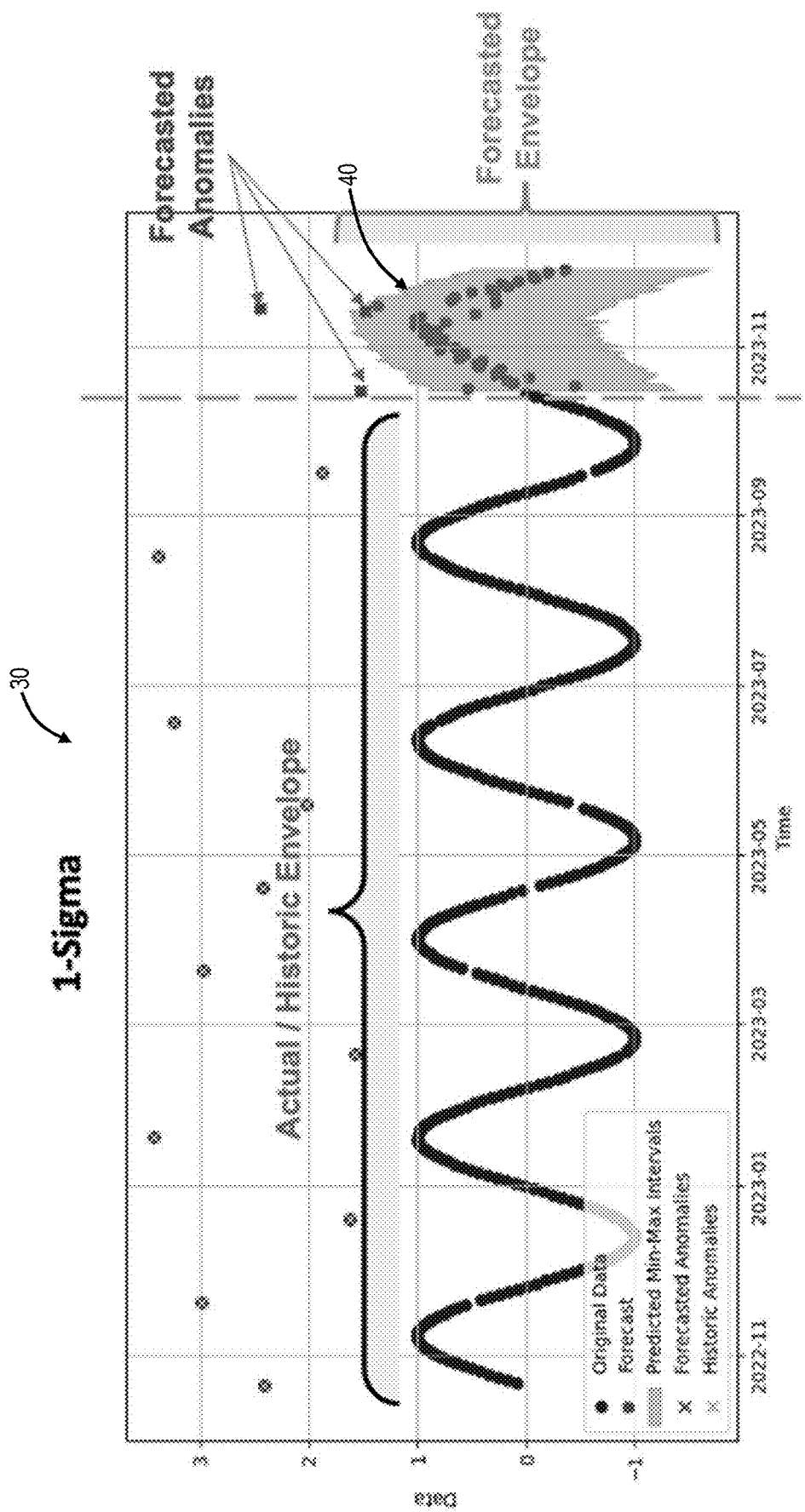
FIG. 3 is a graph of the example time series including a forecasted envelope.

Next, the process 10 includes a forecast envelop step 16 where upper and lower bounds are determined to help understand the normal operating range. The combined historical and forecasted dataset from the previous step 14 is used to find the normal operating range of the data. In an embodiment, the model is configured with a predefined interval width (e.g., 95%), establishing sensitivity boundaries for anomaly forecasting. This approach enables the identification of significant deviations from typical values in the forecasted data. FIG. 3 is a graph of the example time series including a forecasted envelope 40 indicating the sensitivity boundaries for the anomaly forecasting.

Next, the process 10 includes a forecast anomaly step 18 where anomalies are detected using the forecasted envelope

40. The forecasted points within the future data are compared against the sensitivity boundaries as indicated by the forecasted envelope 40. Future anomalies are flagged when the forecasted points lie outside of these boundaries, indicating a significant deviation from expected behavior.

Finally, the process 10 includes an output processing step 20 including raising and monitoring anomaly alerts, triggering workflows, etc. Upon forecasting an anomaly, the process 10 can promptly generate alerts to notify relevant stakeholders. The alerts are triggered for the nearest forecasted anomaly in the future, facilitating timely action and proactive response. In addition, the output of forecast anomaly step 18 can be used to trigger automated workflows, such as scaling up or down network resources to accommodate future needs and proper network resource allocation.

Dashboard and Networking Example

Telecommunication networks are controlled and managed via various approaches including control planes, Software Defined Networking (SDN) controllers, Network Management Systems (NMS), and the like. As described herein, networks can include Layer 0 (photonic such as Dense Wavelength Division Multiplexed (DWDM), Layer 1 (Time Division Multiplexed (TDM) such as Optical Transport Network), Layer 2 (Packet, Multiprotocol Label Switching (MPLS), Segment Routing, etc.), Layer 3 (Internet Protocol (IP)), and the like including combinations thereof.

In operating networks, there is a requirement for ongoing monitoring, such as through a Network Operations Center (NOC) along with various tools. The process 10 can be integrated with an SDN controller, NMS, orchestration system, etc., for the purposes of forecasting various recurring anomalies so that workflows can be triggered for mitigation thereof.

As is known in the art, Performing Monitoring (PM) data is used to describe the behavior of a telecommunications network. PM data can be referred to as telemetry data, Operations, Administration, Maintenance, and Provisioning (OAM&P) data, and the like. Examples of PM data include, without limitation, optical layer data, packet layer data, service and traffic layer data, alarms, hardware operating metrics, etc. The optical layer data can include pre-Forward Error Correction (FEC) Bit Error Rate (BER), post-FEC BER (estimate), number of corrected errors, chromatic dispersion, Polarization Dependent Loss (PDL), Estimated Optical Signal to Noise Ratio (OSNR), latency, TX power, RX power (total, individual channels), power loss, Q factor, fiber type and length, etc. The packet layer data can include port level information such as bandwidth, throughput, latency, jitter, error rate, RX bytes/packets, TX bytes/packets, dropped packet bytes, etc. The service and traffic layer data can be Time Division Multiplexing (TDM) Layer 1 (L1) PM data such as Optical Transport Network (OTN). The packet layer data can be associated with a device port while the service and traffic layer data can be associated with a particular L1 connection/service. The alarm data can be various types of alarms supported by a network element. The hardware operating metrics can include temperature, memory usage, in-service time, etc. Additionally, at the packet level, it is possible to derive values for network traffic (e.g., bandwidth) such as Committed Information Rate (CIR), Excess Information Rate (EIR), etc., on a per link basis.

Those skilled in the art will recognize actual network implementations can span multiple layers. The software application can operate at a single layer or concurrently at multiple layers. Each of these layers can include associated PM data, which describes the operational status over time at the layer. The process 10 can operate on a single set of PM data, as well as combinations.

Figure 4:
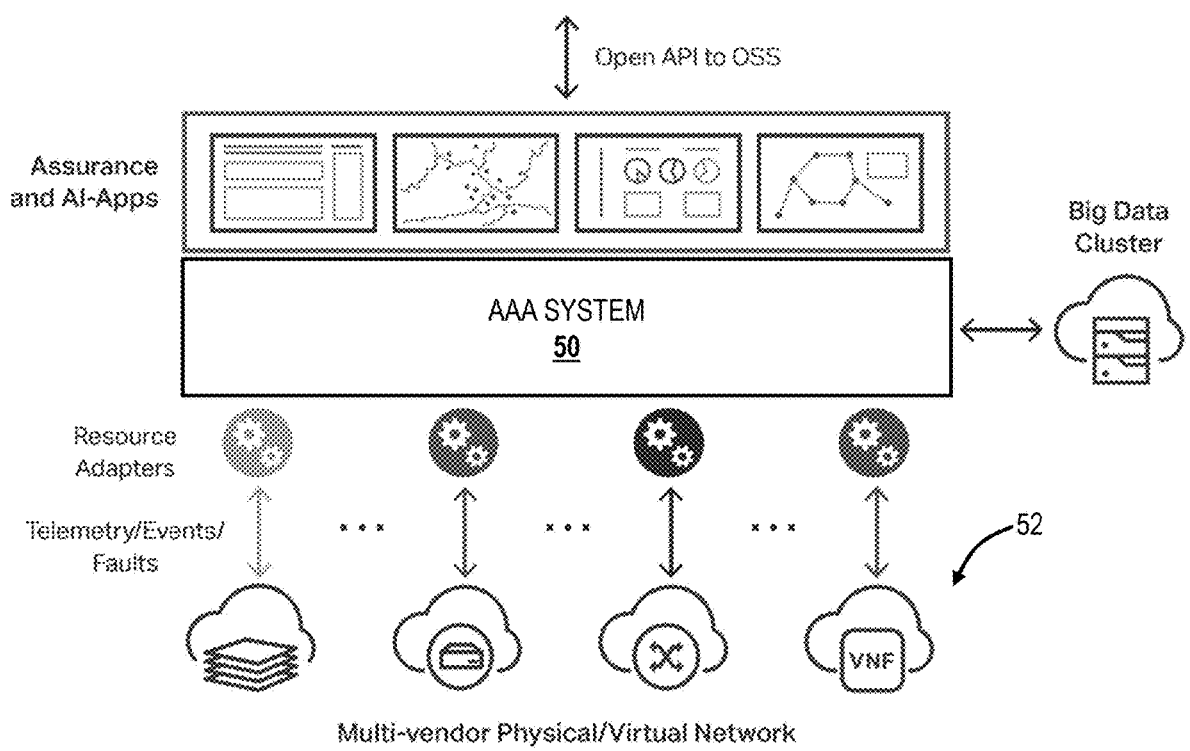
FIG. 4 is a diagram of an Assurance and Analytics Application (AAA) system for managing a network.

FIG. 4 is a diagram of an Assurance and Analytics Application (AAA) system 50 for managing a network 52. The network 52 can be multi-vendor, can include various network elements, switches, routers, Virtual Network Functions (VNFs), etc. that can communicate with the AAA system 50 via resource adapters. The AAA system 50 can include various assurance and AI-applications, including using the process 10.

Of course, managing the network 52 with hundreds or thousands of customers and thousands of services is complex. The AAA system 50 leverages the wealth of information gathered during network operation, for the purpose of network assurance. The goal is to anticipate—and even act upon—potential issues before services are disrupted or a service-level agreement is breached. The AAA system 50 can be an open, vendor-agnostic software suite that leverages end-to-end monitoring and advanced analytics with the latest innovations in AI and Machine Learning (ML) to provide unprecedented insights that simplifies the network 52 and service assurance. The AAA system 50 can be designed on a cloud-native architecture and provides flexible implementation options, allowing installation in an elastic SaaS model, or to be deployed in your cloud or on-premises.

Figure 5:
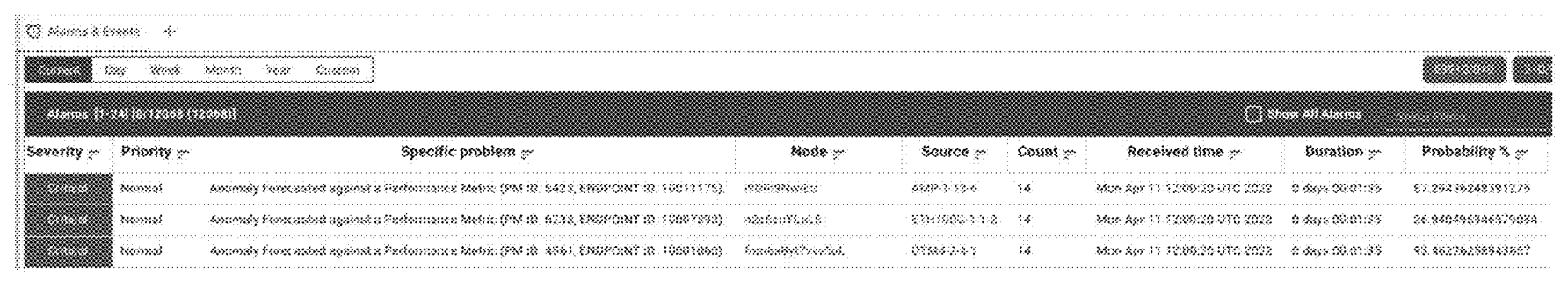

FIG. 5 is a screenshot of an AAA anomaly forecast alert Graphical User Interface (GUI). As shown here, the process 10 can provide a forecast for specific problems, in specific nodes, even specific equipment in that node. The goal is proactive remediation to prevent service disruption, outages, etc. The AAA anomaly forecast alert can be provided via the AAA system 50.

Figure 6:
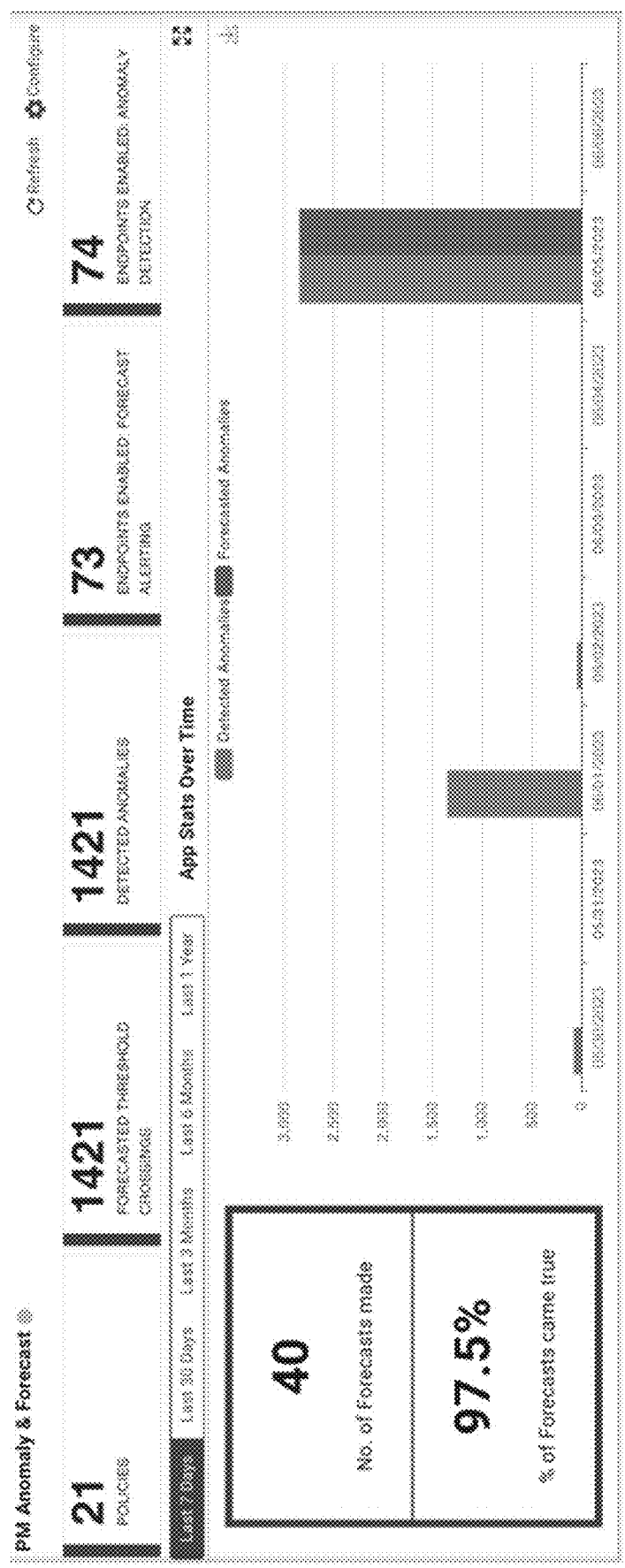
FIG. 6 is a screenshot of networkwide AAA anomaly forecast alerts.

FIG. 6 is a screenshot of networkwide AAA anomaly forecast alerts. With the process 10, there can be various analytics generated during the app run, which can provide valuable insights/stats over time.

Results and Validation Against Example Time Series Data

Figure 7:
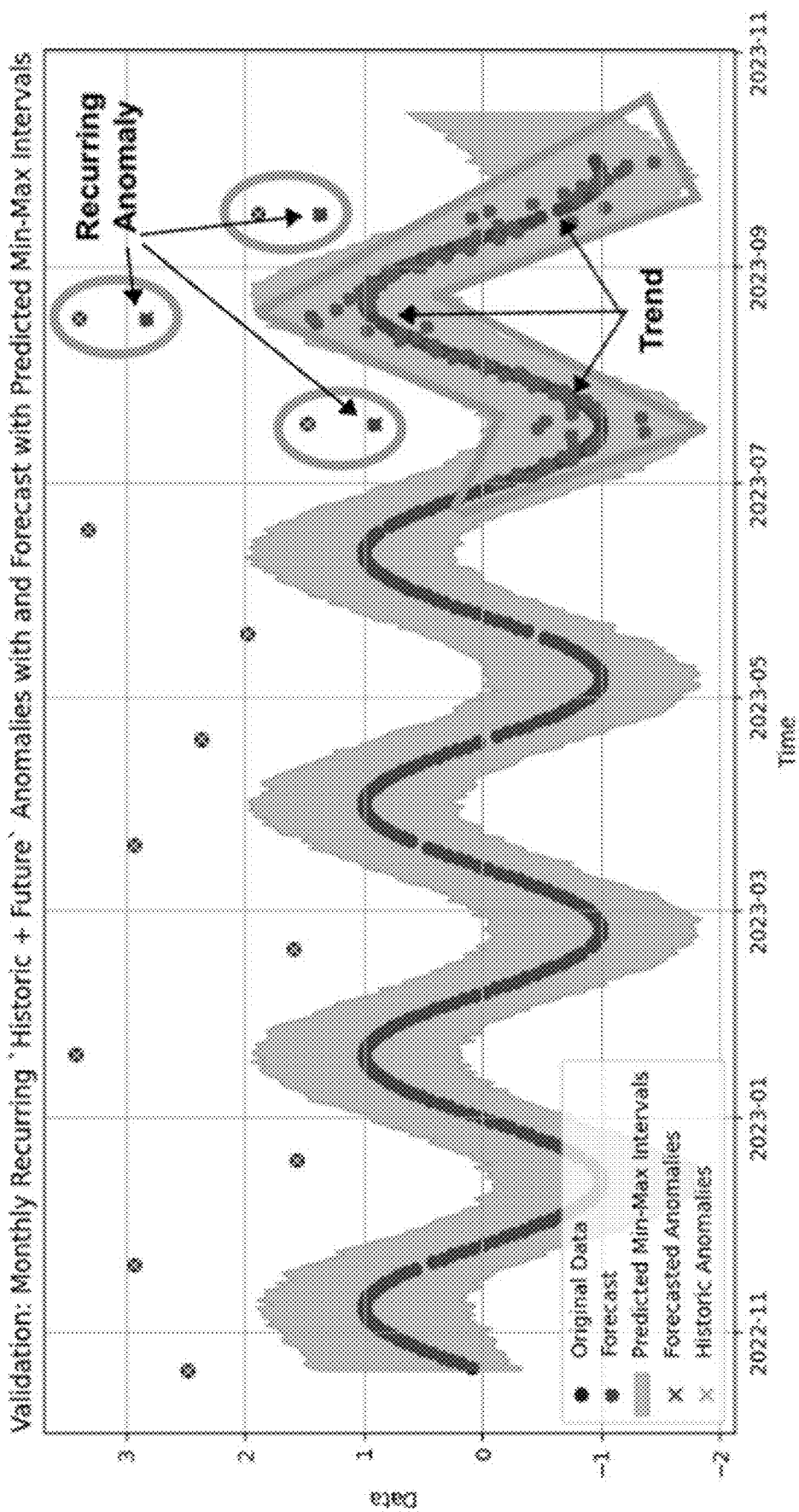
FIGS. 7 and 8 are graphs of example validations of forecasting trends and predicting recurring anomalies with seasonal trend.
Figure 8:
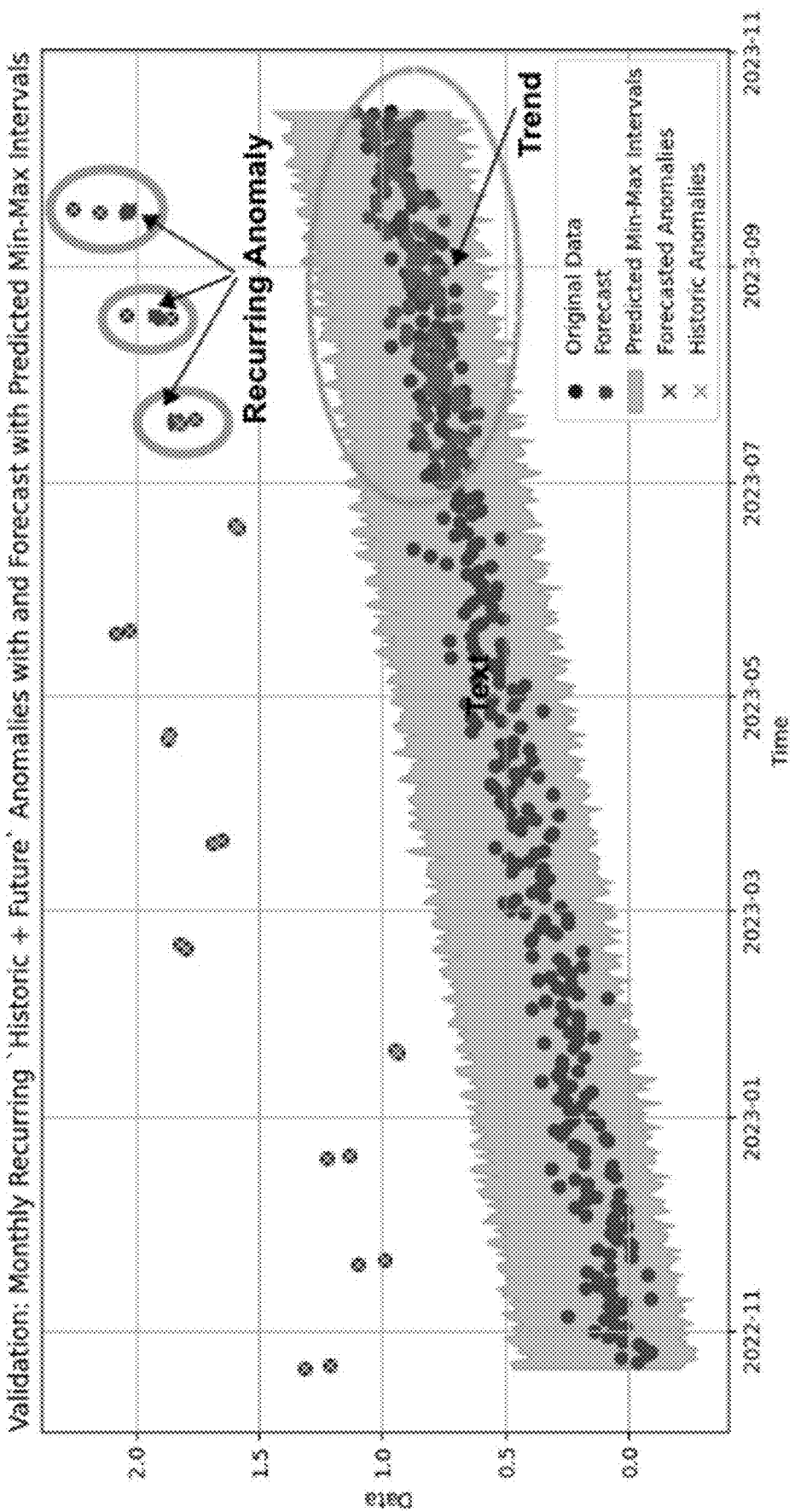

To validate the accuracy of the approach, we conducted tests with the process 10 on a set of simulated data points spanning known time periods. FIGS. 7 and 8 are graphs of example validations of forecasting trends and predicting recurring anomalies with seasonal trend. The plots displayed in FIG. 7 illustrate our algorithm's proficiency in forecasting recurring anomalies and data trends. The visual representation combines historical data points from July 2023 to October 2023 with predicted data points covering the same period. These results serve as a powerful demonstration of our methodology's capacity to not only forecast seasonal trends but also predict recurring anomalies, thereby enhancing decision-making in various domains. The highlighted portion in FIGS. 7 and 8 demonstrate the effectiveness of our methodology.

Benefits

Enhanced Performance: By leveraging a comprehensive architecture, the process 10 ensures accurate time-series forecasting, resulting in reliable and precise predictions for fluctuating traffic patterns. This improved performance leads to efficient resource allocation and proactive decision-making.

Simplified Recurring Anomaly Forecast: The proposed methodology automates the recurring anomaly forecast process within the forecasted future data, eliminating the need for manual detection. By utilizing sensitivity boundaries defined by the interval width, anomalies exceeding the defined boundaries are identified. This automation simplifies the anomaly forecast process, enabling network operators to identify and anticipate anomalous patterns in the future effectively.

Cost-Effective Implementation: The process 10 leverages the capabilities of the cost-efficient algorithms such as Prophet model, which is openly available and does not require expensive hardware or software implementations. This cost-effective approach makes the process 10 accessible and affordable for network operators.

Scalability: The architecture of our methodology can allow automation of scalability in network resource allocation. This scalability ensures that network resources can scale just-in-time to accommodate the increasing demands of modern networks.

Comprehensive Insights: The process 10 incorporates seasonality trends into the forecasted future data, enabling a comprehensive understanding of traffic patterns. By capturing and accounting for seasonality, the methodology facilitates more accurate recurring anomaly forecast and resource planning. This comprehensive insight enhances network performance and ensures optimal resource allocation.

Processing System

Figure 9:
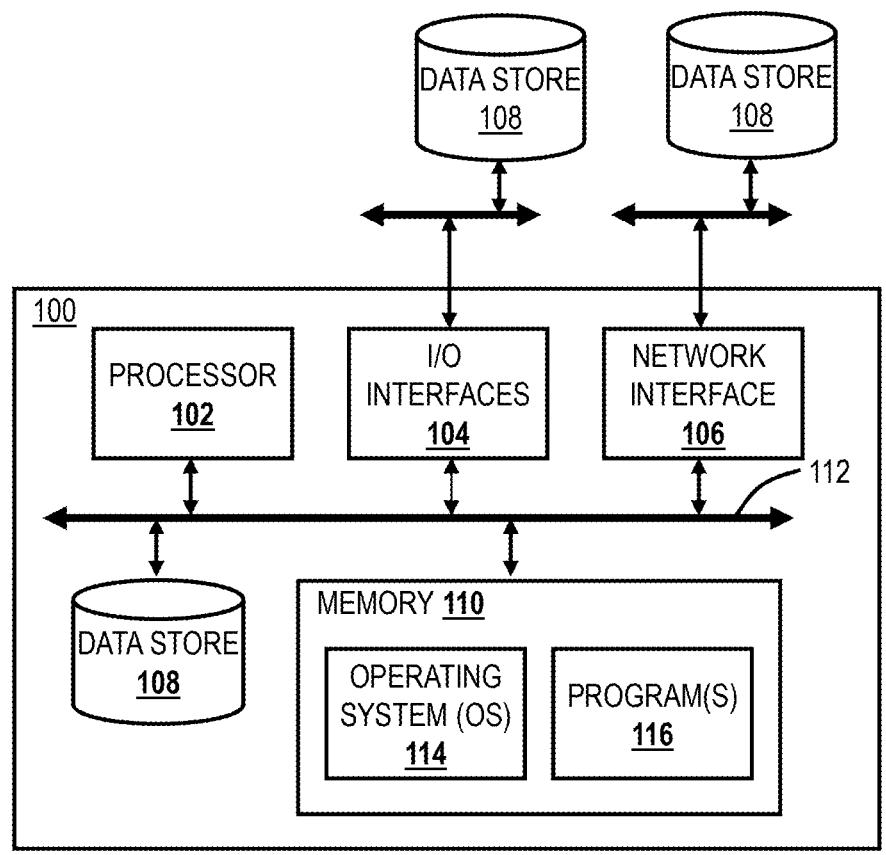
FIG. 9 is a block diagram of a processing system.

FIG. 9 is a block diagram of a processing system 100. The processing system 100 may be a digital computer that, in terms of hardware architecture, generally includes one or more processors 102, input/output (I/O) interfaces 104, a network interface 106, a data store 108, and memory 110. It should be appreciated by those of ordinary skill in the art that FIG. 9 depicts the processing system 100 in an oversimplified manner, and a practical embodiment may include additional components and suitably configured processing logic to support known or conventional operating features that are not described in detail herein. The components (102, 104, 106, 108, and 110) are communicatively coupled via a local interface 112. The local interface 112 may be, for example, but not limited to, one or more buses or other wired or wireless connections, as is known in the art. The local interface 112 may have additional elements, which are omitted for simplicity, such as controllers, buffers (caches), drivers, repeaters, and receivers, among many others, to enable communications. Further, the local interface 112 may include address, control, and/or data connections to enable appropriate communications among the aforementioned components.

The one or more processors 102 are a hardware device for executing software instructions. The one or more processors 102 may be any custom made or commercially available processor, a Central Processing Unit (CPU), an auxiliary processor among several processors associated with the processing system 100, a semiconductor-based microprocessor (in the form of a microchip or chipset), or generally any device for executing software instructions. When the processing system 100 is in operation, the one or more processors 102 are configured to execute software stored within the memory 110, to communicate data to and from the memory 110, and to generally control operations of the processing system 100 pursuant to the software instructions. The I/O interfaces 104 may be used to receive user input from and/or for providing system output to one or more devices or components.

The network interface 106 may be used to enable the processing system 100 to communicate on a network, such as the Internet. The network interface 106 may include, for example, an Ethernet card or adapter or a Wireless Local Area Network (WLAN) card or adapter. The network interface 106 may include address, control, and/or data connections to enable appropriate communications on the network.

A data store 108 may be used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 108 may incorporate electronic, magnetic, optical, and/or other types of storage media. In one example, the data store 108 may be located internal to the processing system 100, such as, for example, an internal hard drive connected to the local interface 112 in the processing system 100. Additionally, in another embodiment, the data store 308 may be located external to the processing system 100 such as, for example, an external hard drive connected to the I/O interfaces 104 (e.g., SCSI or USB connection). In a further embodiment, the data store 108 may be connected to the processing system 100 through a network, such as, for example, a network-attached file server.

The memory 110 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 110 may incorporate electronic, magnetic, optical, and/or other types of storage media. Note that the memory 110 may have a distributed architecture, where various components are situated remotely from one another but can be accessed by the processor 102. The software in memory 110 may include one or more software programs, each of which includes an ordered listing of executable instructions for implementing logical functions. The software in the memory 110 includes a suitable Operating System (O/S) 114 and one or more programs 116. The operating system 114 essentially controls the execution of other computer programs, such as the one or more programs 116, and provides scheduling, input-output control, file and data management, memory management, and communication control and related services. The one or more programs 116 may be configured to implement the various processes, algorithms, methods, techniques, etc. described herein.

Of note, the general architecture of the processing system 100 can realize the AAA system 50, implement the process 10, etc. However, the processing system 100 is merely presented as an example architecture for illustration purposes. Other physical embodiments are contemplated, including virtual machines (VM), software containers, appliances, network devices, and the like.

In an embodiment, the various techniques described herein can be implemented via a cloud service. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. The phrase "Software as a Service" (SaaS) is sometimes used to describe application programs offered through cloud computing. A common shorthand for a provided cloud computing service (or even an aggregation of all existing cloud services) is "the cloud."

Process

Figure 10:
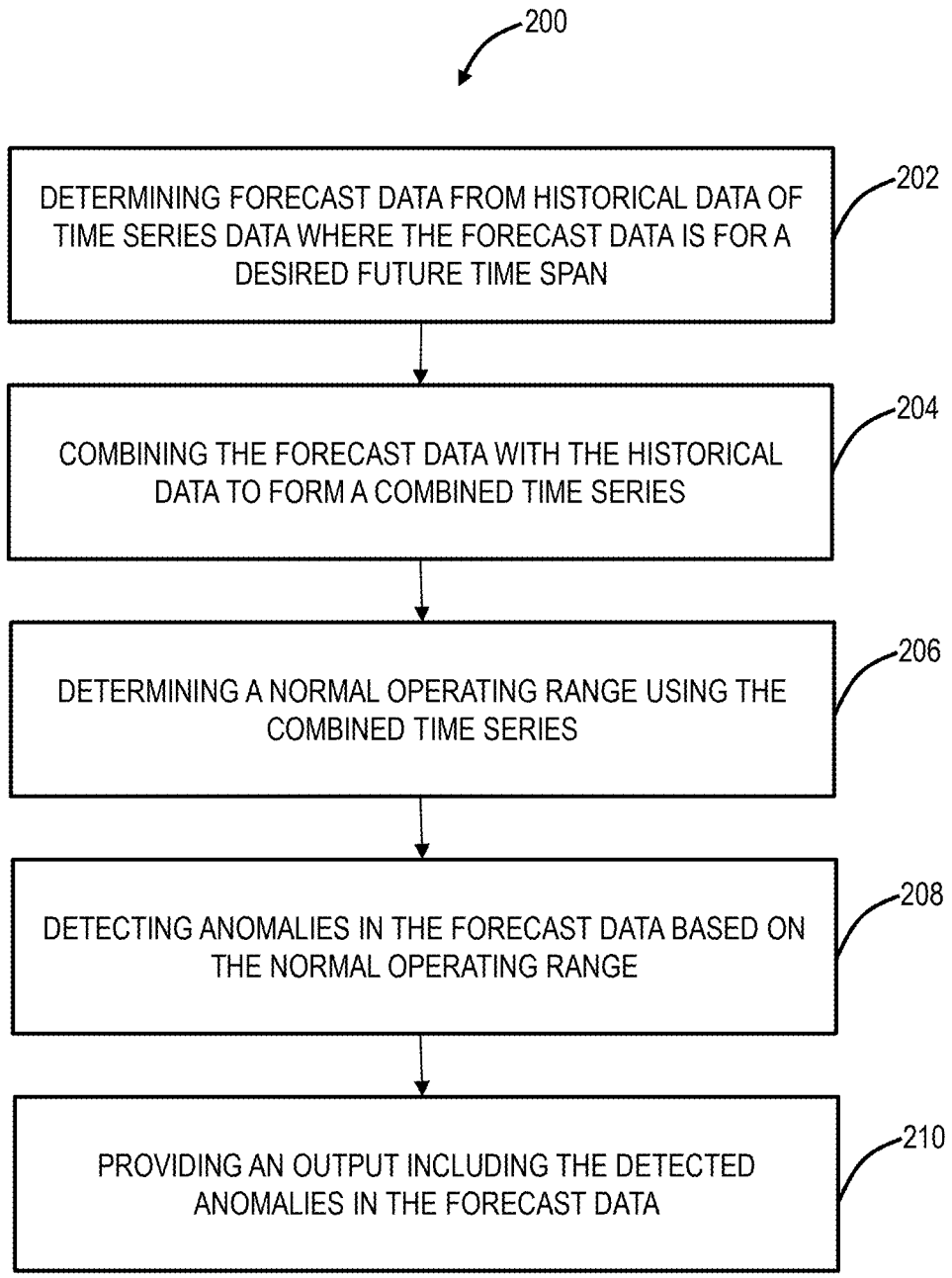
FIG. 10 is a flowchart of a process for forecasting recurring anomalies in time series data.

FIG. 10 is a flowchart of a process 200 for forecasting recurring anomalies in time series data. The process 200 contemplates implementation as a computer-implemented method having steps, via a processing device or system configured to implement the steps, via a cloud service configured to implement the steps, and as a non-transitory computer-readable medium storing instructions that, when executed, cause one or more processors to implement the steps.

The steps include determining forecast data from historical data of time series data where the forecast data is for a desired future time span (step 202); combining the forecast data with the historical data to form a combined time series (step 204); determining a normal operating range using the combined time series (step 206); detecting anomalies in the forecast data based on the normal operating range (step 208); and providing an output including the detected anomalies in the forecast data (step 210).

The steps can further include providing the output as an alert in a graphical user interface. The graphical user interface can include a dashboard that displays one or more of the detected anomalies in the forecast data and their corresponding times, associated equipment related to the detected anomalies, aggregate data for a plurality of time series and any detected anomalies, a number of forecasts, and a percentage of forecasts that came true.

The steps can further include triggering a workflow based on the output. The time series data can relate to a network and describes some aspects of network bandwidth therein, and wherein the workflow includes scaling up or down network resources in the network based on the detected anomalies and their corresponding times. The normal operating range can be a predefined interval width on the combined time series and the detecting anomalies includes determining any forecast data outside a sensitivity boundary of the predefined interval width.

The time series data can be associated with Performance Monitoring (PM) data in a network. The steps can further include performing the determining the forecast data, the combining, the determining the normal operating range, the detecting, and the providing for one or more additional time series that are each different PM data in the network.

Conclusion

This innovative methodology seamlessly combines precise data trend forecasting with the ability to predict recurring anomalies. Utilizing the strengths of advanced data trend forecasting methodology (or usage of existing algorithms such as Facebook-Prophet models) and sensitivity boundaries, our proposal significantly enhances decision-making, system performance, and data analysis across various domains. Network operators can confidently guide resource allocation, fine-tune network performance, and proactively address recurring anomalies, ultimately leading to streamlined operations, an improved network experience, and boosted operational efficiency.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including software and/or firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," "a circuit configured to," "one or more circuits configured to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, etc. described herein contemplate use in any and all combinations with one another, including individually as well as combinations of less than all of the various elements, operations, steps, methods, processes, algorithms, functions, techniques, etc.

What is claimed is:

1. A non-transitory computer-readable medium comprising instructions that, when executed, cause one or more processors to implement steps of:
   determining forecast data from historical data of time series data where the forecast data is for a desired future time span, wherein the time series data relates to a network and describes network traffic therein, wherein the forecast data includes recurring anomalies predicted for the desired future time span and the time series data comprises Performance Monitoring (PM) data collected from network elements in the network;

combining the forecast data with the historical data to form a combined time series;
determining a normal operating range using the combined time series such that the normal operating range is determined based on both the historical data and the forecast data, wherein the normal operating range is defined by a fixed, predefined sensitivity boundary interval width explicitly configured in advance and applied uniformly regardless of statistical variance, and wherein the normal operating range is determined without computing statistical confidence intervals or error variance estimates;
detecting anomalies in the forecast data based on the normal operating range, wherein the normal operating range includes sensitivity boundaries defined by a predefined interval width on the combined time series, and wherein the detecting anomalies includes determining forecast data points including forecasted recurring anomalies in seasonal or periodic patterns that lie outside the sensitivity boundaries;
providing an output including the detected anomalies in the forecast data; and
triggering a workflow based on the output, wherein the workflow includes scaling up or down network resources in the network through network-specific actions comprising bandwidth scaling, routing adjustments or Quality of Service (QoS) parameter modifications based on the detected anomalies and their corresponding times.

2. The non-transitory computer-readable medium of claim 1, wherein the steps further include
providing the output as an alert in a graphical user interface.

3. The non-transitory computer-readable medium of claim 2, wherein the graphical user interface includes a dashboard that displays one or more of the detected anomalies in the forecast data and their corresponding times, associated equipment related to the detected anomalies, aggregate data for a plurality of time series and any detected anomalies, a number of forecasts, and a percentage of forecasts that came true.

4. The non-transitory computer-readable medium of claim 1, wherein the time series data is for Performance Monitoring (PM) data for packet layer data, and wherein the PM data includes any of latency, jitter, error rate, RX bytes/packets, TX bytes/packets, or dropped packet bytes.

5. The non-transitory computer-readable medium of claim 4, wherein the PM data is used to derive values for network traffic including one of a Committed Information Rate (CIR) and an Excess Information Rate (EIR).

6. The non-transitory computer-readable medium of claim 1, wherein the normal operating range is determined using a forecast envelope that incorporate sonality analysis to account for recurring traffic patterns, and the detecting anomalies includes determining any of the forecast data outside a sensitivity boundary of the predefined interval width.

7. The non-transitory computer-readable medium of claim 1, wherein the time series data comprises multi-layer Performance Monitoring (PM) data selected from optical layer data, packet layer data, and service layer data, and wherein anomalies are detected by correlating deviations across at least two layers of PM data.

8. The non-transitory computer-readable medium of claim 7, wherein the steps further include
performing the determining the forecast data, the combining, the determining the normal operating range, the detecting, and the providing for one or more additional time series that are each different PM data in the network.

9. A computer-implemented method comprising steps of:
determining forecast data from historical data of time series data where the forecast data is for a desired future time span, wherein the time series data relates to a network and describes network traffic therein, wherein the forecast data includes recurring anomalies predicted for the desired future time span and the time series data comprises network telemetry Performance Monitoring (PM) data including packet transmission, routing, or switching metrics;
combining the forecast data with the historical data to form a combined time series;
determining a normal operating range using the combined time series such that the normal operating range is determined based on both the historical data and the forecast data, wherein the normal operating range is defined by a fixed, predefined sensitivity boundary interval width explicitly configured in advance and independent of statistical confidence calculations, and wherein no statistical confidence bounds are computed for the time series;
detecting anomalies in the forecast data based on the normal operating range, wherein the normal operating range includes sensitivity boundaries defined by a predefined interval width on the combined time series, and wherein the detecting anomalies includes determining forecast data points including forecasted recurring anomalies in periodic or seasonal cycles that lie outside the sensitivity boundaries;
providing an output including the detected anomalies in the forecast data; and
triggering a workflow based on the output, wherein the workflow includes scaling up or down network resources in the network through automated actions comprising reallocating traffic across links, adjusting routing configurations, or scaling bandwidth based on the detected anomalies and their corresponding times based on the detected anomalies and their corresponding times.

10. The computer-implemented method of claim 9, wherein the steps further include
providing the output as an alert in a graphical user interface.

11. The computer-implemented method of claim 10, wherein the graphical user interface includes a dashboard that displays one or more of the detected anomalies in the forecast data and their corresponding times, associated equipment related to the detected anomalies, aggregate data for a plurality of time series and any detected anomalies, a number of forecasts, and a percentage of forecasts that came true.

12. The computer-implemented method of claim 9, wherein the time series data is for Performing Monitoring (PM) data for packet layer data, and wherein the PM data includes any of latency, jitter, error rate, RX bytes/packets, TX bytes/packets, or dropped packet bytes.

13. The computer-implemented method of claim 12, wherein the PM data is used to derive values for network traffic including one of a Committed Information Rate (CIR) and an Excess Information Rate (EIR).

14. The computer-implemented method of claim 9, wherein the normal operating range is determined using a forecast envelope that incorporates seasonality analysis to account for recurring traffic patterns, and the detecting anomalies includes determining any of the forecast data outside a sensitivity boundary of the predefined interval width.

15. The computer-implemented method of claim 9, wherein the time series data comprises multi-layer Performance Monitoring (PM) data selected from optical layer data, packet layer data, and service layer data, and wherein anomalies are detected by correlating deviations across at least two layers of PM data.

16. The computer-implemented method of claim 15, wherein the steps further include
performing the determining the forecast data, the combining, the determining the normal operating range, the detecting, and the providing for one or more additional time series that are each different PM data in the network.

17. A processing device comprising:
one or more processors; and
memory storing instructions that, when executed, cause the one or more processors to
determine forecast data from historical data of time series data where the forecast data is for a desired future time span, wherein the time series data relates to a network and describes network traffic therein, wherein the forecast data includes recurring anomalies predicted for the desired future time span and the time series data represents telecommunications network traffic metrics including at least one of latency, jitter packet delay, throughput, or error rate
combine the forecast data with the historical data to form a combined time series,
determine a normal operating range using the combined time series such that the normal operating range is determined based on both the historical data and the forecast data, wherein the normal operating range is defined by a fixed, predefined sensitivity boundary interval width explicitly configured in advance and applied uniformly regardless of statistical variance, and wherein no statistica confidence intervals or residual error distributions are computed;
detect anomalies in the forecast data based on the normal operating range, wherein the normal operating range includes sensitivity boundaries defined by a predefined interval width on the combined time series, and wherein the anomalies are detected by determining forecast data points including forecasted recurring anomalies in periodic or seasonal patterns that lie outside the sensitivity boundaries,
provide an output including the detected anomalies in the forecast data, and
trigger a workflow based on the output, wherein the workflow includes scaling up or down network resources in the network through network control actions including scaling bandwidth, reallocating traffic, or adjusting routing parameters based on the detected anomalies and their corresponding times.

18. The processing device of claim 17, wherein the instructions that, when executed, cause the one or more processors to
provide the output as an alert in a graphical user interface.

19. The processing device of claim 17, wherein
time series data is for Performance Monitoring (PM) data for packet layer data, and wherein the PM data includes any of bandwidth, throughput, latency, jitter, error rate, RX bytes/packets, TX bytes/packets, or dropped packet bytes.

20. The processing device of claim 17, wherein the normal operating range is determined using a forecast envelope that incorpora easonality analysis to account for recurring traffic patterns, and the detecting anomalies includes determining any of the forecast data outside a sensitivity boundary of the predefined interval width.

* * * * *